United States Patent
Anderson et al.

(10) Patent No.: US 9,647,302 B2
(45) Date of Patent: *May 9, 2017

(54) BATTERY THERMAL SYSTEM WITH A STACKING FRAME

(71) Applicant: GM Global Technology Operations LLC, Detroit, MI (US)

(72) Inventors: Alastair Gordon Anderson, Wiesbaden (DE); Karsten Reinhard Spaeter, Huenstetten (DE)

(73) Assignee: GM Global Technology Operations LLC, Detroit, MI (US)

(*) Notice: Subject to any disclaimer, the term of this patent is extended or adjusted under 35 U.S.C. 154(b) by 478 days.

This patent is subject to a terminal disclaimer.

(21) Appl. No.: 13/705,398

(22) Filed: Dec. 5, 2012

(65) Prior Publication Data

US 2014/0154547 A1    Jun. 5, 2014

(51) Int. Cl.
*H01M 10/50* (2006.01)
*H01M 10/04* (2006.01)
(Continued)

(52) U.S. Cl.
CPC ..... *H01M 10/5016* (2013.01); *H01M 2/1077* (2013.01); *H01M 10/0413* (2013.01);
(Continued)

(58) Field of Classification Search
USPC ........................................ 429/120
See application file for complete search history.

(56) References Cited

U.S. PATENT DOCUMENTS 6,729,384 B1   5/2004   Lo
7,862,924 B2 *  1/2011   Kim ................... H01M 2/1077
                                                429/120
(Continued)

FOREIGN PATENT DOCUMENTS

CN    102257653 A    11/2011
CN    102356505 A     2/2012
(Continued)

OTHER PUBLICATIONS

Non-Final Office Action dated Aug. 1, 2013, pertaining to U.S. Appl. No. 13/053,983, filed Mar. 22, 2011.

*Primary Examiner* — Ula C Ruddock
*Assistant Examiner* — Osei Amponsah
(74) *Attorney, Agent, or Firm* — Quinn IP Law

(57) ABSTRACT

A battery pack assembly. Each assembly includes a battery cell and a cooling fin assembly positioned in thermal communication with the battery cell for thermal cooling thereof. The cooling fin assembly includes a generally planar cooling fin defining a compliant structure and at least one foot defining a flat surface along an edge of the cooling fin. A heat sink and a frame structure contain the battery cells and the cooling fin assemblies such that upon placement of the cooling fin assemblies and the battery cells in the frame structure, a substantial entirety of the flat surfaces of the feet of the cooling fin assemblies are aligned to define a generally planar surface with which to thermally engage the heat sink. A vehicle propulsion system having a battery pack assembly and methods of assembling a battery pack assembly is also described.

11 Claims, 12 Drawing Sheets

(51) Int. Cl.
  *H01M 10/42* (2006.01)
  *H01M 10/625* (2014.01)
  *H01M 2/10* (2006.01)
  *H01M 10/647* (2014.01)
  *H01M 10/6555* (2014.01)
  *H01M 10/613* (2014.01)

(52) U.S. Cl.
  CPC ..... *H01M 10/4207* (2013.01); *H01M 10/613* (2015.04); *H01M 10/625* (2015.04); *H01M 10/647* (2015.04); *H01M 10/6555* (2015.04); *H01M 2220/20* (2013.01); *Y10T 29/49108* (2015.01)

(56) References Cited

U.S. PATENT DOCUMENTS

| | | |
|---|---|---|
| 2007/0238018 A1 | 10/2007 | Lee et al. |
| 2008/0193830 A1* | 8/2008 | Buck et al. .................... 429/120 |
| 2009/0061299 A1* | 3/2009 | Uchida et al. ................ 429/156 |
| 2011/0059347 A1* | 3/2011 | Lee .......................... B60L 11/18 429/120 |
| 2011/0064985 A1 | 3/2011 | Lee et al. |
| 2011/0189525 A1* | 8/2011 | Palanchon .......... H01M 10/615 429/120 |
| 2012/0107649 A1 | 5/2012 | Anderson et al. |
| 2012/0258337 A1* | 10/2012 | Wang ................ H01M 10/0525 429/50 |

FOREIGN PATENT DOCUMENTS

| | | | |
|---|---|---|---|
| CN | 102456938 A | 5/2012 | |
| CN | 102498601 A | 6/2012 | |
| JP | 2009-140714 | * 6/2009 | ............ H01M 10/50 |

* cited by examiner

BATTERY THERMAL SYSTEM WITH A STACKING FRAME

FIELD OF THE INVENTION

The present disclosure relates generally to batteries, and more particularly to a battery thermal system with structural components and a module stacking frame to improve the manufacturability and robustness of the battery thermal system.

BACKGROUND

Current battery-based vehicular propulsion systems are in the form of a battery pack made up of numerous battery modules each of which is in turn made up of one or more battery cells that may deliver electric current for motive power for an automobile. In the present context, the term "motive power" describes a battery pack capable of providing more than mere starting power for another power source (such as an internal combustion engine); it includes battery packs capable of providing sustained power sufficient to propel a vehicle in a manner consistent with that for which it was designed.

An example of this type of system is shown in FIG. 1. A vehicular propulsion system in the form of a battery pack 1 employing numerous battery modules 10 is shown in a partially-exploded view. Depending on the power output desired, numerous battery modules 10 may be combined as a group or section 100; such may be aligned to be supported by a common tray 200 that can also act as support for coolant hoses 300 that can be used in configurations where supplemental cooling may be desired. In addition to providing support for the numerous battery modules 10, tray 200 and a bulkhead 400 may support other modules, such as a voltage, current and temperature measuring module 500. Placement of individual battery cells 35 within one of battery modules 10 is shown, as is the covering thereof by a sub-module 600. In one typical example, battery pack 1 may include about two hundred individual battery cells 35. Such a system is described in U.S. Publication 2012/0258337 A1, entitled Battery Thermal Interfaces with Microencapsulated Phase Change Materials for Enhanced Heat Exchange Properties, published Oct. 11, 2012, which is incorporated herein by reference.

A battery thermal system with interlocking structural components is shown in FIGS. 2A and 2B. The battery thermal system includes a module having a module base 55 and a heat sink 60. The module base 55 contains the battery cells 35 and solid fin assemblies 70, which are arranged along the edges of the battery cells 35. The solid fin assembly 70 includes a pair of solid fins 85 surrounded by an expansion unit 90, and inserted into a foot 95. The design of the solid fin assembly 70 allows deformation and therefore cell tolerance and expansion management. The feet 95 have interlocking profiles 110, 115 on opposite ends. The profile on one foot interlocks with the opposing profile on the next foot. As the battery cells 35 and solid fin assemblies 70 are arranged, the interlocking profiles 110, 115 on the feet 95 interlock with each other, forming a surface onto which the heat sink 60 can be easily attached. The solid fin assemblies 70 conduct heat generated in the battery cells 35 to the heat sinks 60, which are mounted on at least one side of the module base 55 (typically both sides). The module base 55 can be held together by end plates 75 and brackets 80, if desired. The feet 95 are in contact with the heat sink 60. The contact can be direct such that the feet 95 touch the heat sink 60, or indirect in which there is a layer of material between the feet 95 and the heat sink 60.

The design of the solid fin assembly 70 due to the flexible joints formed along the adjacently joined feet 95 allows deformation due to the tower of stacked solid fin assemblies that may bend along its length, forming a banana or snake shape. Such a system is described in U.S. Publication 2012/0107649 A1, entitled Battery Thermal System with Interlocking Structure Components, published May 3, 2012, which is incorporated herein by reference. While such a system works well for its intended purpose, the present inventors have determined that this flexing tendency can cause loss of thermal contact and related reduction in the thermal performance of the battery thermal system.

SUMMARY

Against the above background, the present disclosure is directed to improve the manufacturability and robustness, reduce cost and ensure alignment and define module length of a battery thermal system with a module stacking frame structure and a method of assembling a battery thermal system with a module stacking frame structure.

One aspect of the disclosure is a battery pack assembly for an automobile. In one embodiment, the battery pack assembly may include a plurality of battery cells and a plurality of cooling fin assemblies. Each of the cooling fin assemblies may be positioned in thermal communication with at least one of the battery cells for thermal cooling thereof. The cooling fin assemblies may include at least one generally planar cooling fin defining a compliant structure therein and at least one foot defining a flat surface along an edge of the cooling fin. A heat sink and a frame structure which includes structural components configured to contain the battery cells and the cooling fin assemblies such that upon placement of the cooling fin assemblies and the battery cells in the frame structure a substantial entirety of the flat surfaces of the feet of the cooling fin assemblies are aligned to define a generally planar surface with which to thermally engage the heat sink.

Another aspect of the disclosure is a vehicle propulsion system for an automobile having a battery pack assembly including a plurality of battery cells. The vehicle propulsion system may include a plurality of cooling fin assemblies, each of the cooling fin assemblies positioned in thermal communication with at least one of the battery cells for thermal cooling thereof. The cooling fin assemblies may include a pair of generally planar cooling fins defining a compliant structure therein and at least one foot defining a flat surface along an edge of the cooling fins. A heat sink and a frame structure which includes structural components configured to contain the battery cells and the cooling fin assemblies. The structural components of the frame structure may include a top structural frame, a bottom structural frame and an end cap such that upon placement of the cooling fin assemblies in the frame structure a substantial entirety of the flat surfaces of the feet of the cooling fin assemblies are aligned to define a generally planar surface with which to thermally engage the heat sink.

A further aspect of the disclosure is a method of assembling a battery pack assembly for an automobile wherein the battery pack assembly may include a plurality of battery cells and a plurality of cooling fin assemblies. Each of the cooling fin assemblies may include at least one generally planar cooling fin defining a compliant structure therein and at least one foot defining a flat surface along an edge of the cooling fin. A heat sink and a frame structure including structural components. The frame structure may include a top structural frame, a bottom structural frame and an end cap. The method may include stacking in the frame structure the cooling fin assemblies in thermal communication with at least one of the battery cells, wherein the feet on opposing edges of the cooling fin assemblies are slotted on the outside of the frame structure resulting in flat surfaces and a space between adjacent feet of the cooling fin assemblies. Compressing the cooling fin assemblies and the battery cells with the end cap until the end cap bottoms-out on the top structural frame. Attaching the heat sink to the flat surfaces of the feet such that maximum generally planar contact between the cooling fin assemblies and the heat sink is ensured for thermal cooling of the battery pack assembly.

These and other features, aspects and advantages of the present disclosure will become better understood with reference to the following description and the appended claims.

BRIEF DESCRIPTION OF THE DRAWINGS

Though the specification concludes with claims particularly pointing out and distinctly claiming the present disclosure, it is believed that the present disclosure will be better understood from the following description taken in conjunction with the accompanying drawings, in which:

DETAILED DESCRIPTION

Figure 1:
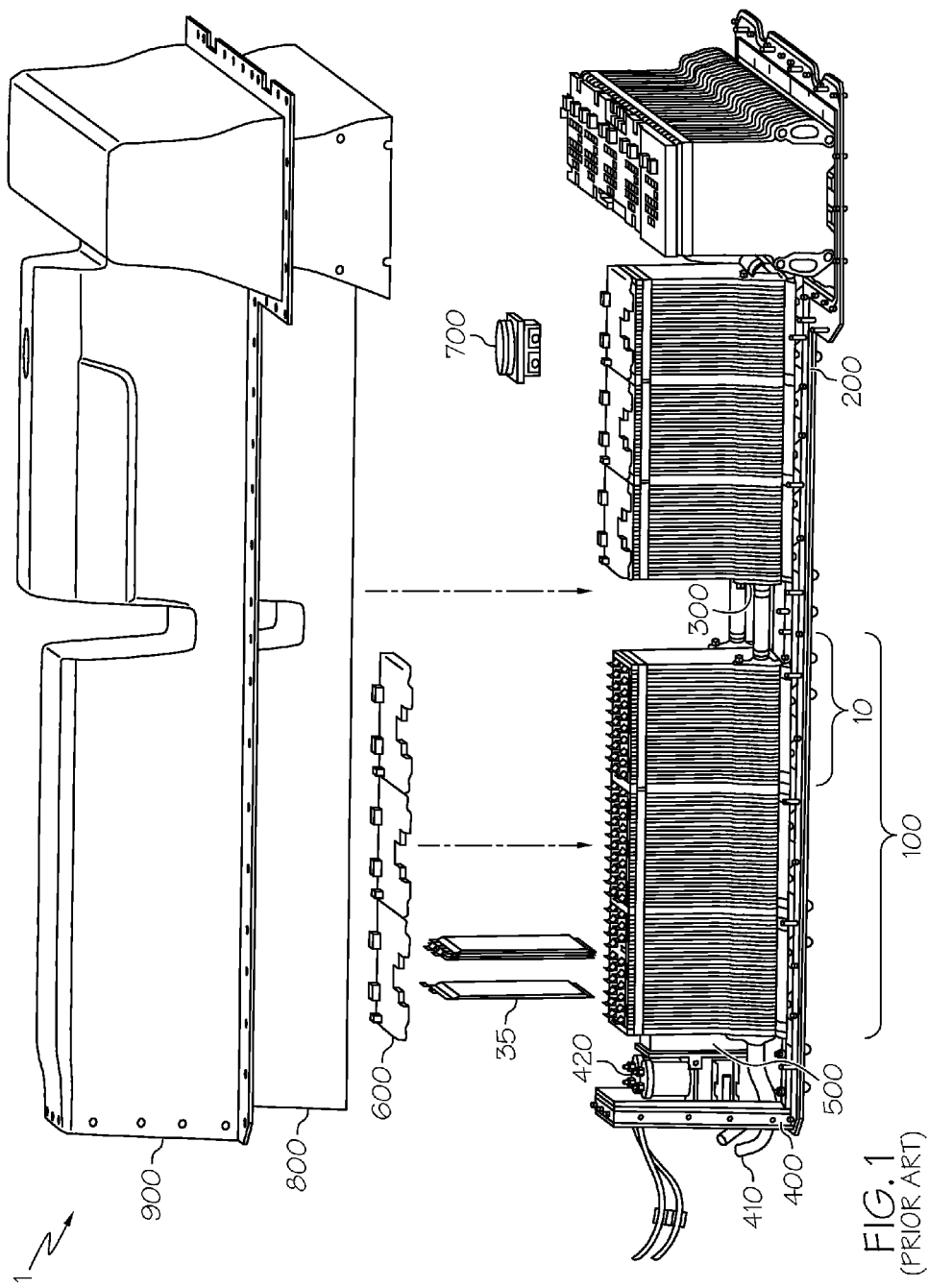
FIG. 1 is an illustration of a prior art vehicular propulsion system.
Figure 2A:
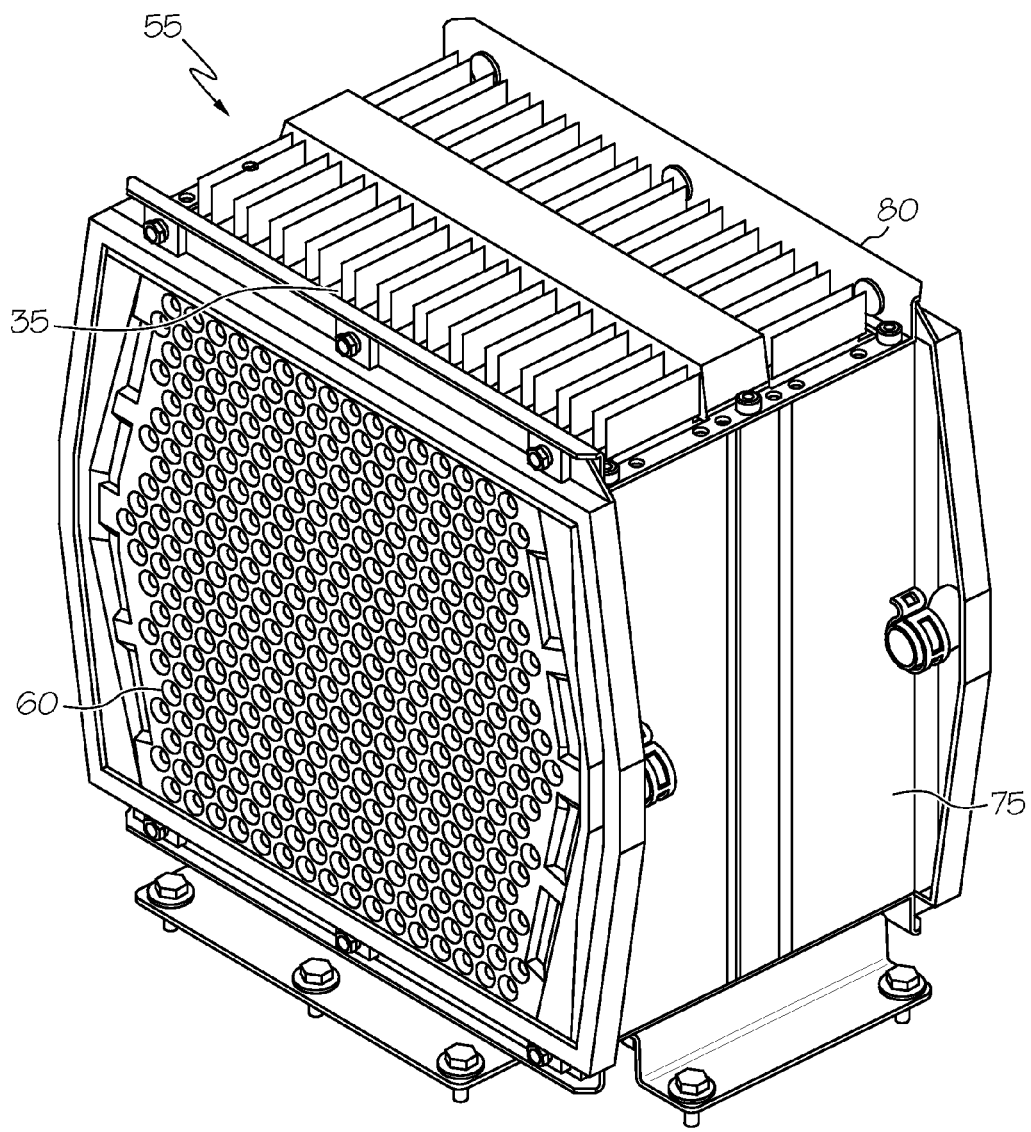
FIGS. 2A and 2B are illustrations of a prior art battery thermal system with interlocking structural components.
Figure 2B:
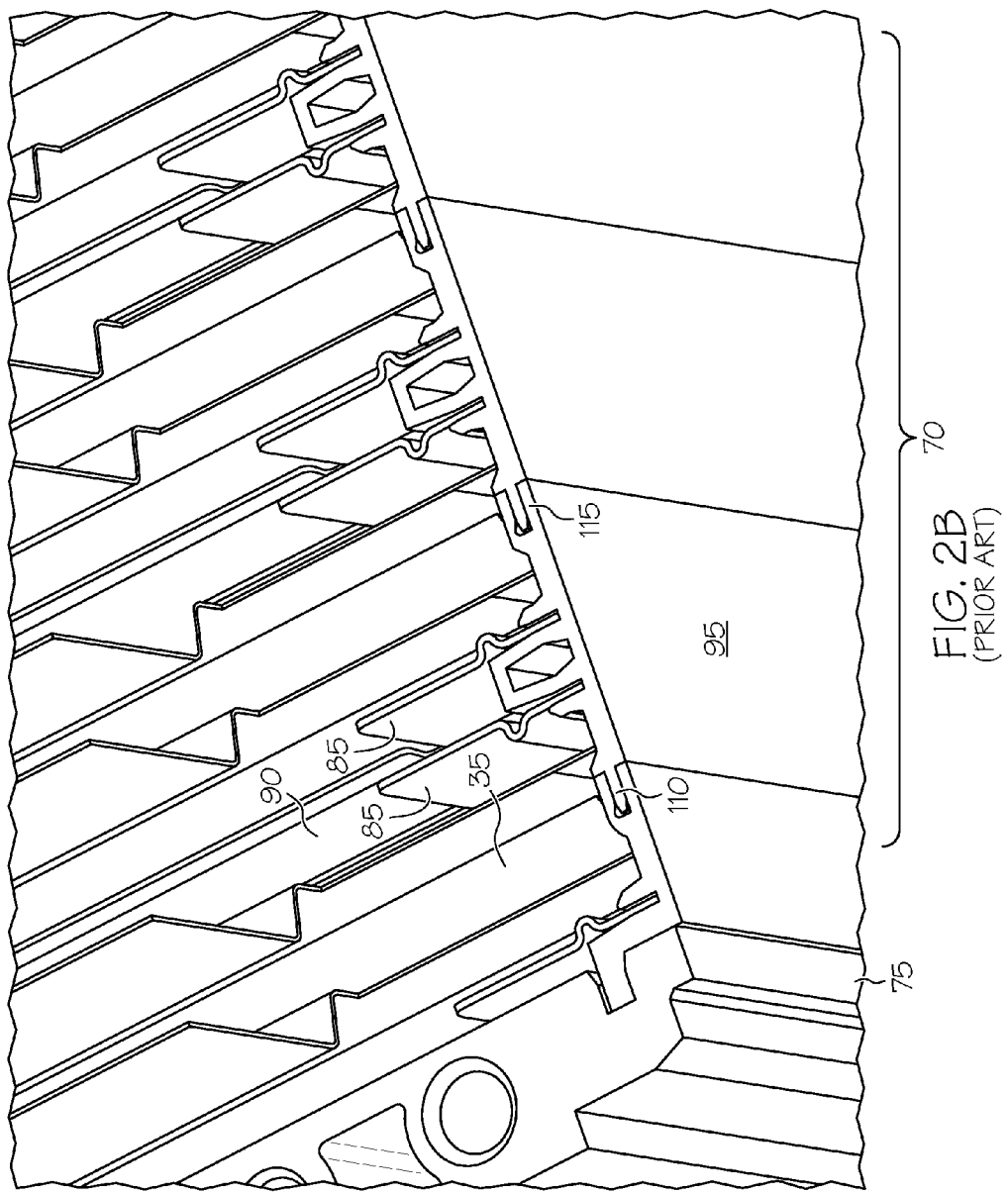

Features and advantages of the disclosure will now be described with occasional reference to specific embodiments. However, the disclosure may be embodied in different forms and should not be construed as limited to the embodiments set forth herein. Rather, these embodiments are provided so that this disclosure will be thorough and complete and will fully convey the scope of the disclosure to those skilled in the art.

The new design provides a simple, more robust battery thermal system with a module stacking frame structure which simplifies manufacturability, reduces cost, ensures alignment of the cooling fin assemblies without deformation and defines a length of the battery thermal system.

Manufacturing is easier because the stacking procedure is simple due to the modular stacking frame structure allowing for ensured alignment between adjacent cooling fin assemblies on both sides of the frame structure to have a flat smooth surface due to the compliant structure of the cooling fin to provide flexible width tolerance of the cooling fin assemblies without any deformation of the battery thermal system. Also, the thermal connection between the cooling fin assembly and a heat sink is optimized because the frame structure allows a flat smooth surface without deformation due to the alignment of the plurality of cooling fin assemblies to each other creating a flat interface surface. By "cooling fin," we mean that there are no cooling channels (and thus no coolant circulating) in the cooling fin assemblies between the battery cells. Thus, the design provides lower material, manufacturing, and warranty costs.

In one embodiment, the battery thermal system includes a battery pack assembly 15 for an automobile may include a plurality of battery cells 40 and a plurality of cooling fin assemblies 30, wherein the plurality of cooling fin assemblies 30 are positioned in thermal communication with the plurality of battery cells 40 for thermal cooling of the battery pack assembly 15. The cooling fin assembly 30 may include at least one cooling fin 36, wherein the cooling fin 36 may include a compliant structure, or alternatively a pair of cooling fins 36 including a compliant structure and a foot 32 on at least one edge or side of the cooling fin assembly 30, or alternatively a foot 32 disposed on each opposing edge or side of the cooling fin assembly 30, such that the foot 32 has a flat surface 33 on each end thereof. The cooling fin assembly 30 may further include a pair of cooling fins 36 disposed on opposing surfaces of an expansion unit 34. The expansion unit 34 may include a layer or sheet of foam (shown) or alternatively a metal leaf spring. The compliant structure of the cooling fin 36 is a v-profile section 38 which may allow for flexible width tolerance of the cooling fin 36 and the foot 32 to align with a modular stacking frame structure 20. Alternatively, the compliant structure of the cooling fin 36 is an opening 39 which may allow for flexible width tolerance of the cooling fin 36 and the foot 32 to align with a frame structure 20.

The frame structure 20 may include structural components configured to contain the plurality of battery cells 40 and the plurality of cooling fin assemblies 30. The structural components of the frame structure 20 may include a top structural frame 22 with at least one rib 26 formed thereon and a top spacer 28, a bottom structural frame 23 and an end cap 24. The frame structure 20 ensures alignment of the cooling fin assemblies 30 and the plurality of battery cells 40 and defines a length of the battery pack assembly. In one form, the frame structure 20 is made of plastic or related material. The foot 32 on at least one side or opposing edges of the cooling fin assemblies 30 may align to the frame structure 20 defining a flat surface 33 thereon. The flat surfaces 33 formed by the feet 32 of the plurality of cooling fin assemblies 30 contained within the structural components of the frame structure 20 ensures parallelism of the battery pack assembly 15 without causing deformation, as shown in FIGS. 4D through 4F.

A heat sink 50 is coupled to the flat surface 33 of the foot 32 on at least one side or opposite sides of the plurality of cooling fin assemblies 30 to define a generally planar surface with which to thermally engage the heat sink 50. A layer 52 of thermal interface material (TIM) may be applied between the flat surface 33 of the foot 32 and the heat sink 50, which helps to provide good thermal contact. The heat generated in the battery pack assembly 15 is conducted along the cooling fin 36, through the foot 32, across the layer 52 of TIM, and into the coolant flowing through the heat sink 50. Examples of commercially available TIMs used may be from Saint-Gobain, alfatec GmbH & Co. KG and 3M; these materials are typically made of an acrylic polymer, acrylic, silicon or silicon elastomer material having a thermal conductivity in the range of about 0.1 to 8.0 W/mK, an estimated temperature drop in the range of about 0 to 4.7 K and a thickness in the range of about 0.2 to 1.02 mm. Another example of a TIM used may be a paste-like adhesive.

The cooling fin 36 can be made of any suitable heat conductive material, including, but not limited to metals and plastic. The foot 32 can be made of any material capable of transferring heat. Suitable materials include, but are not limited to aluminum. Suitable processes for producing the foot 32 include, but are not limited to, extrusion, which allows high volume manufacture. The shape and material of the foot 32 are selected so that heat flow from the battery cells 40 to the heat sink 50 is evenly distributed over the whole contact area between the foot 32 and the heat sink 50 (or foot 32, layer 52 of TIM, and the heat sink 50) and without a large temperature drop in the foot 32 themselves. As a result, there is no heat flow concentration, and the entire contact area between the foot 32 and heat sink 50 (or foot 32, layer 52 of TIM, and the heat sink 50) is available for heat transfer.

In a further embodiment, a vehicle propulsion system for an automobile having a battery pack assembly 15 may include a plurality of battery cells 40, the system may include a plurality of cooling fin assemblies 30, wherein each cooling fin assembly 30 may be positioned in thermal communication with at least one of the plurality of battery cells 40 for thermal cooling of the vehicle propulsion system. The cooling fin assembly 30 may include a pair of cooling fins 36, wherein the pair of cooling fins 36 may include a compliant structure, and a foot 32 on opposite sides or opposing edges of the cooling fin assembly 30, wherein the foot 32 having a flat surface 33 on each end thereof. The cooling fin assembly 30 may further include a pair of cooling fins 36 disposed on opposing surfaces of an expansion unit 34. The expansion unit 34 may include a layer or sheet of foam (shown) or a metal leaf spring. The compliant structure of the pair of cooling fins 36 is a v-profile section 38 which may allow for flexible width tolerance of the cooling fins 36 and the feet 32 to align with a modular stacking frame structure 20. Alternatively, the compliant structure of the cooling fins 36 is an opening 39 which may allow for flexible width tolerance of the pair of cooling fins 36 and the feet 32 to align with a frame structure 20.

The frame structure 20 may include structural components in planar relationship with the plurality of battery cells 40 and the plurality of cooling fin assemblies 30. The structural components of the frame structure 20 may include a top structural frame 22 with at least one rib 26 formed thereon and a top spacer 28, a bottom structural frame 23 and an end cap 24. The structure components of frame structure 20 ensures alignment of the cooling fin assemblies 30 and the plurality of battery cells 40 and defines a length of the vehicle propulsion system. Wherein the frame structure 20 is made of a material as described in the previous embodiment. The foot 32 on at least one side or opposing edges of the cooling fin assemblies 30 may align to the frame structure 20 defining a flat surface 33 thereon. The flat surfaces 33 formed by the feet 32 of the plurality of cooling fin assemblies 30 contained within the structural components of the frame structure 20 ensures parallelism of the battery pack assembly 15 without causing snaking, banana-shaping or other related deformation discussed above.

A heat sink 50 is coupled to the flat surfaces 33 of the feet 32 on opposite sides of the plurality of cooling fin assemblies 30 within the frame structure 20 in order to define a generally planar surface with which to thermally engage the heat sink 50. A layer 52 of TIM may be applied between the flat surfaces 33 of the feet 32 and the heat sink 50, which helps to provide good thermal contact. The heat generated in the battery pack assembly along the cooling fin 36, through the feet 32, across the layer 52 of TIM, and into the coolant flowing through the heat sink 50.

The heat sink 50 has a channel through which the coolant is pumped. The heat sink can be formed by stamping two metal sheets (e.g., of aluminum) and brazing or welding them together, forming the channels. Because the heat sink 50 is located on the flat surfaces 33 of the feet 32 on opposite sides of the plurality of cooling fin assemblies 30 within the frame structure 20, only one coolant inlet and outlet are needed for each heat sink. This eliminates the need for multiple seals for each cooling fin, and reduces the cost and complexity of the system.

In yet a further embodiment, a method of assembling a battery pack assembly 15 for an automobile wherein the method may include a plurality of battery cells 40 and a plurality of cooling fin assemblies 30. The cooling fin assembly 30 may include at least one cooling fin 36, wherein the cooling fin 36 may include a compliant structure and a foot 32 on opposite sides or opposing edges of the cooling fin assembly 30, the foot 32 having a flat surface 33 on each end thereof. A layer 52 of TIM may be applied between the flat surface 33 of the foot 32 and the heat sink 50, which helps to provide good thermal contact. The cooling fin assembly 30 may further include a pair of cooling fins 36 disposed on opposing surfaces of an expansion unit 34. The expansion unit 34 may include a layer or sheet of foam (shown) or a metal leaf spring. The compliant structure of the cooling fin 36 is a v-profile section 38 which may allow for flexible width tolerance of the cooling fin 36 and the feet 32 to align with a modular stacking frame structure 20. Alternatively, the compliant structure of the cooling fin 36 is an opening 39 which may allow for flexible width tolerance of the cooling fin 36 and the feet 32 to align with a frame structure 20.

The frame structure 20 may include structural components in planar relationship with the plurality of cooling fin assemblies 30 and the plurality of battery cells 40. The frame structure 20 ensures alignment of the cooling fin assemblies 30 and the plurality of battery cells 40 and defines a length of the battery pack assembly 15. The frame structure 20 including a top structural frame 22 with at least one rib 26 formed thereon and a top spacer 28, a bottom structural frame 23 and an end cap 24. Wherein the frame structure 20 is made of a material as described in the previous embodiment.

Stacking in the frame structure 20 the plurality of cooling fin assemblies 30 in thermal communication between the plurality of battery cells 40, wherein the feet 32 on opposite sides or opposing edges of the cooling fin assemblies 30 are slotted on the outside of the frame structure 20 creating a flat surface 33. Once the frame structure 20 has reached full capacity or fully occupied, the end cap 24 is compressed on top of the stacked plurality of cooling fin assemblies 30 and plurality of battery cells 40 until the end cap 24 bottoms-out on the top structural frame 22. Bolting the end cap 24 to the top structural frame 22. A space or clearance 37 is formed between adjacent feet 32 of plurality of cooling fin assemblies 30 contained in the frame structure 20. The feet 32 on opposite sides or opposing edges of the cooling fin assemblies 30 may align to the frame structure 20 defining a flat surface 33 thereon. The flat surfaces 33 formed by the feet 32 of the plurality of cooling fin assemblies 30 contained within the structural components of the frame structure 20 ensures parallelism of the battery pack assembly 15 without causing the deformation discussed above.

Attaching a heat sink 50 to the flat surfaces 33 of the feet 32 on opposite sides of the frame structure 20 such that maximum generally planar contact between the plurality of cooling fin assemblies 30 and the heat sink 50 help ensure thermal cooling of the battery pack assembly 15.

In one embodiment, attaching a heat sink 50 to the flat surfaces 33 of the feet 32 on opposite sides of the frame structure 20 by means of at least one clamp 54 and bolt 56 helps ensure good thermal contact. In another embodiment, attaching a heat sink 50 to the flat surfaces 33 of the feet 32 on opposite sides of the frame structure 20 may be done by means of an adhesive 58 to ensure good thermal contact. In situations where the adhesive 58 is a glue or related material known to those skilled in the art, the adhesive 58 may act as the layer of TIM 52 described above.

Figure 3:
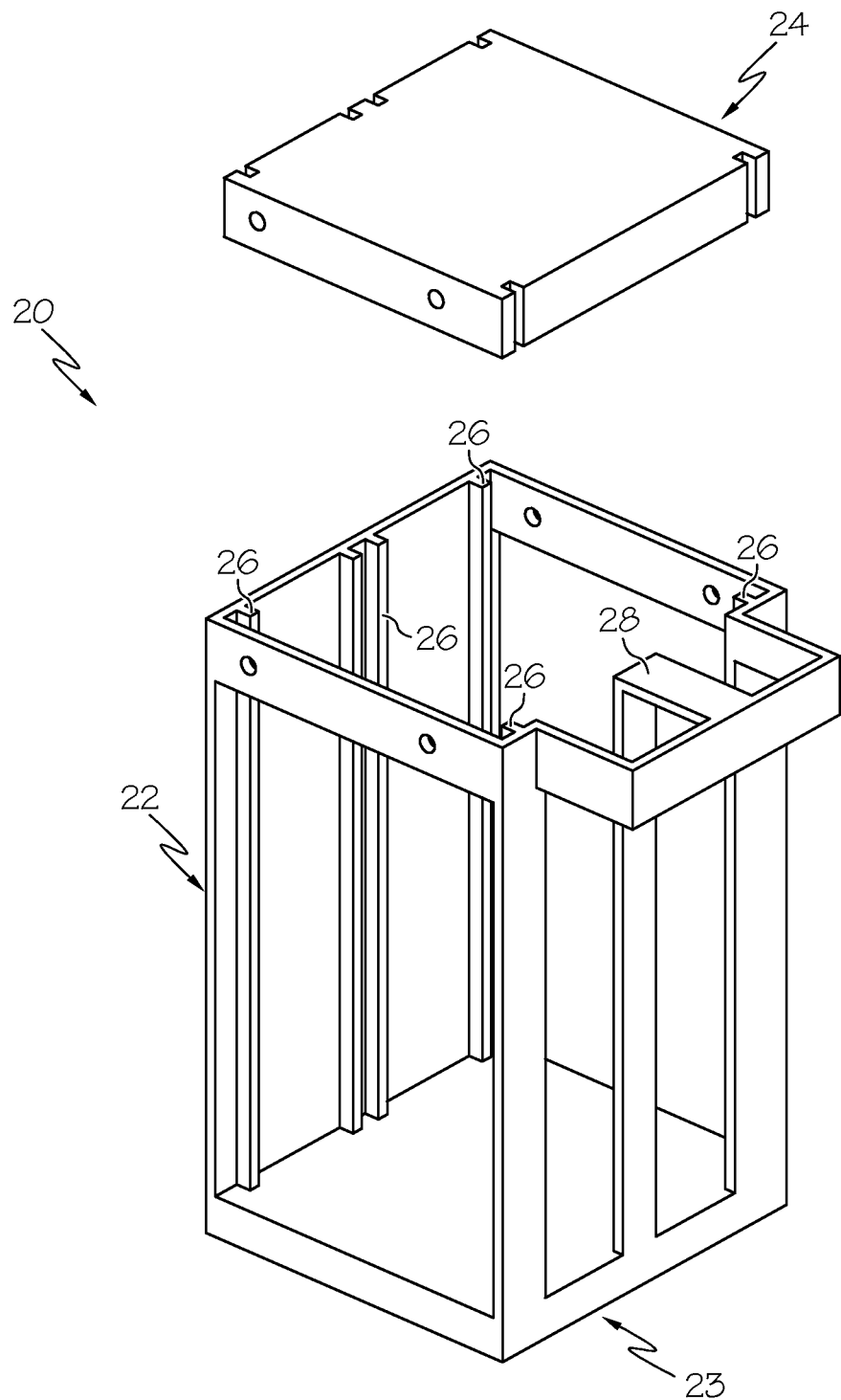
FIG. 3 is an illustration of the modular stacking frame structure according to an aspect of the present disclosure.

Referring now to the Figures, FIG. 3 is an illustration of a modular stacking frame structure 20 including structural components for ensured parallelism and a defined structural length. The structural components of the frame structure 20 may include a top structural frame 22 including a top spacer 28 and at least one rib 26 thereon, and a bottom structural frame 23. The top structural frame 22 may be assembled to the bottom structural frame 23, or alternatively, the top and bottom structural frame 22, 23 may be combined together as a single molded component. A further structural component of the frame structure 20 is an end cap 24. The end cap 24 may be assembled to the top structural frame 22 and bottom structural frame 23 by placing the end cap 24 on the top of the top structural frame 22 and compressing until the end cap 24 bottoms-out on, directly contacts with, the top structural frame 22. The end cap 24 may then be bolted to the top structural frame 22. Other means known to one skilled in the art for attaching the end cap 24 may be used.

Figure 4A:
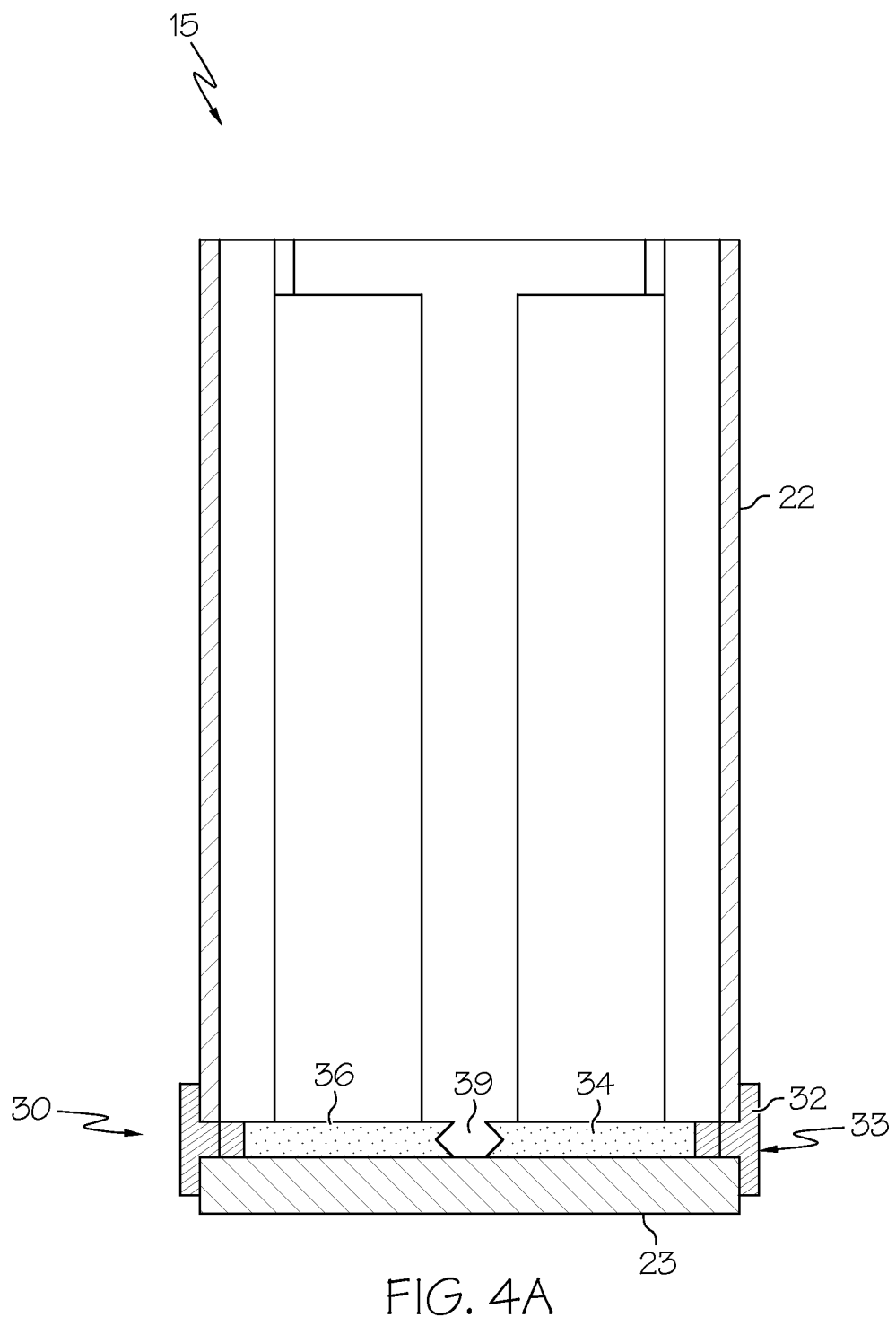
FIG. 4A is an illustration of the modular stacking frame structure of FIG. 3 wherein placement of a first of numerous cooling fin assemblies to assemble a battery pack assembly according to an aspect of the present disclosure.

FIG. 4A is an illustration of a battery pack assembly 15 including structural components of the modular stacking frame structure including the top structural frame 22 assembled to the bottom structural frame 23, and the cooling fin assembly 30 stacked or slotted along the sides of the top structural frame 22. The cooling fin assembly 30 may comprise a pair of cooling fins 36 disposed on opposing surfaces of an expansion unit 34, wherein said expansion unit is a layer of foam (shown) or a leaf spring and a foot 32 on each edge or opposing edges of the cooling fins 36. The cooling fin assembly 30 includes a compliant structure such as an opening 39 allowing each half of the cooling fin assembly 30 to align to the respective side of the top structural frame 22 individually thus creating a flexible width tolerance. Alternatively, the cooling fin 36 may include a compliant structure such as an elastic joining portion, a v-profile 38 (now shown), allowing each half of the cooling fin assembly 30 to move relative to each other creating a flexible width tolerance.

Figure 4B:
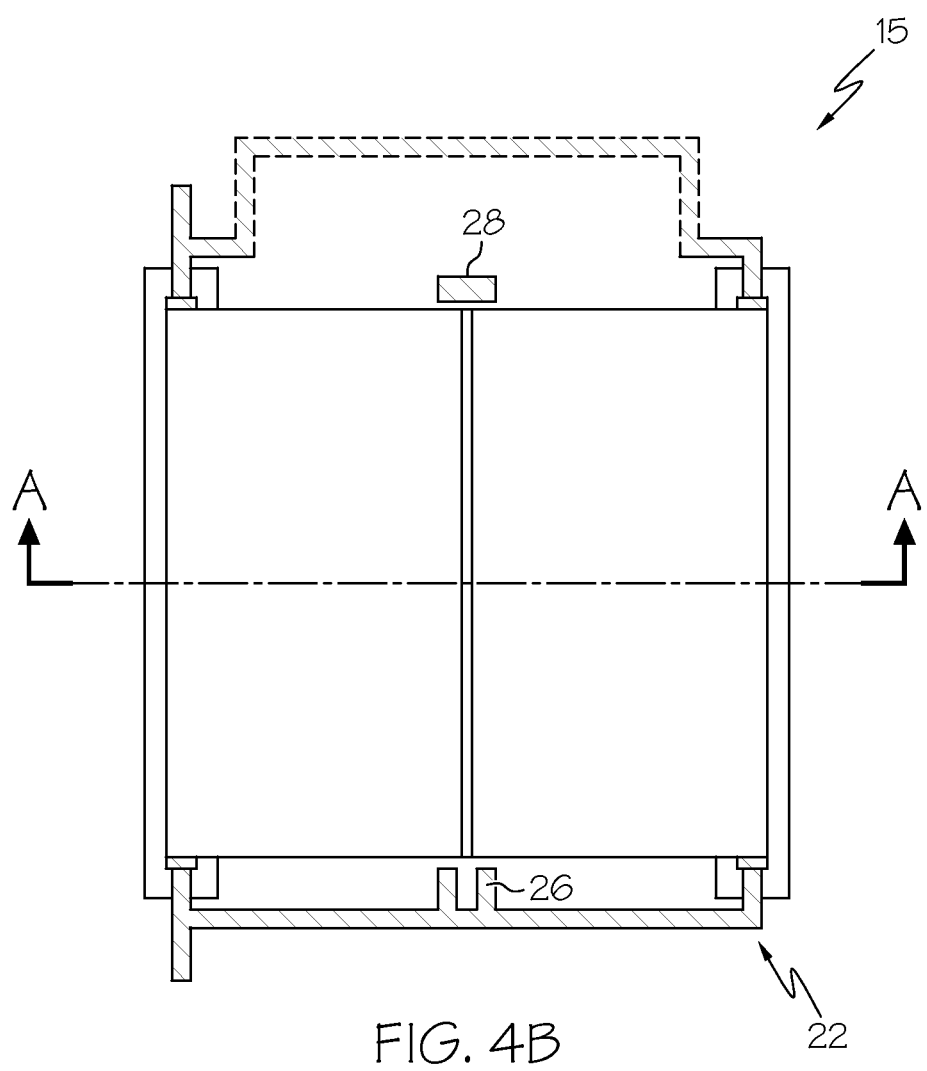
FIG. 4B is a cross sectional view of the battery pack assembly of FIG. 4A.

FIG. 4B is a cross sectional view of the battery pack assembly 15 of FIG. 4A wherein at least one cooling fin assembly 30 is stacked or slotted along the sides of the top structural frame 22, the at least one rib 26 and the top spacer 28.

Figure 4C:
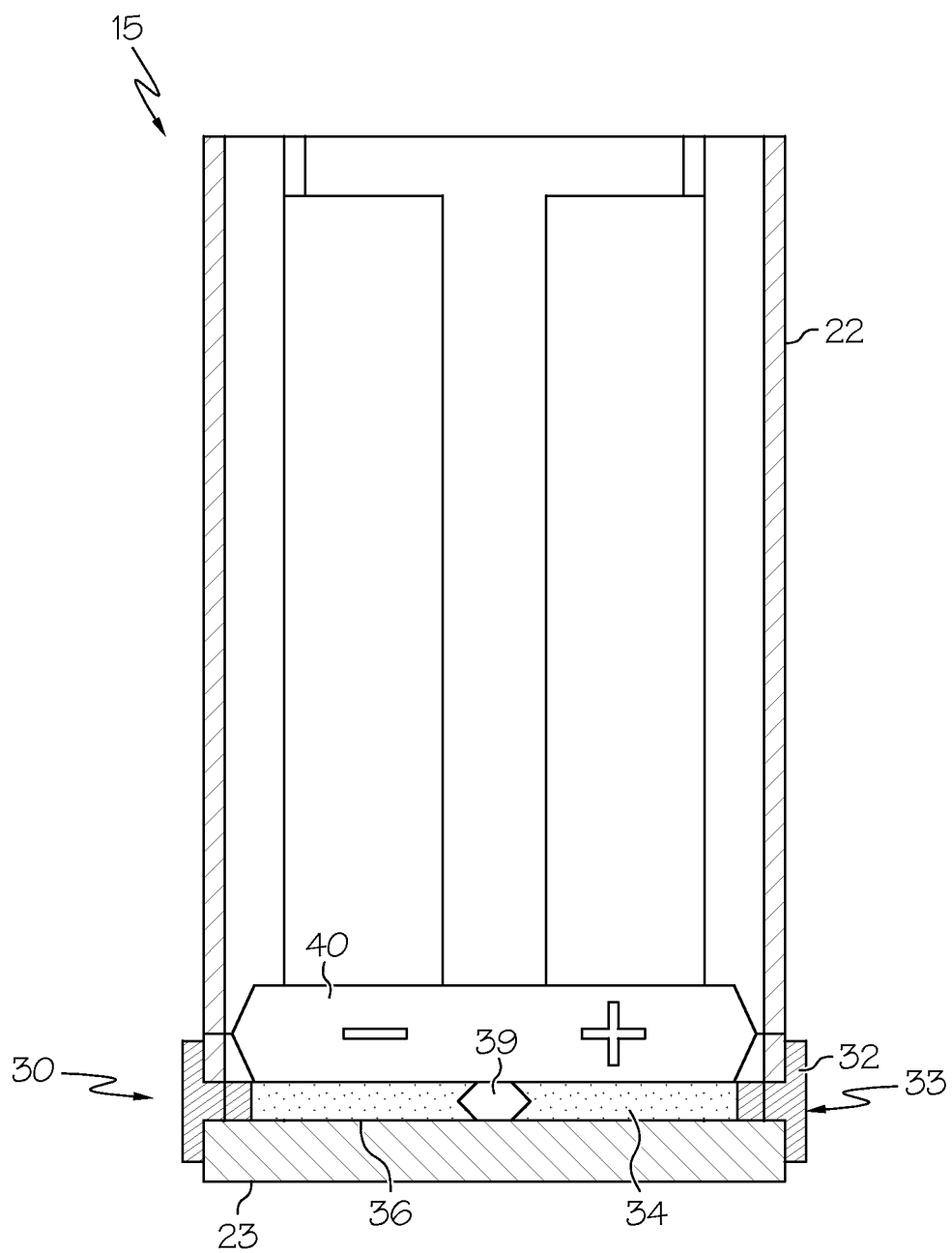
FIG. 4C is a further illustration of the placement of a first of numerous battery cells onto the first cooling fin assembly of FIG. 4A.
Figure 4D:
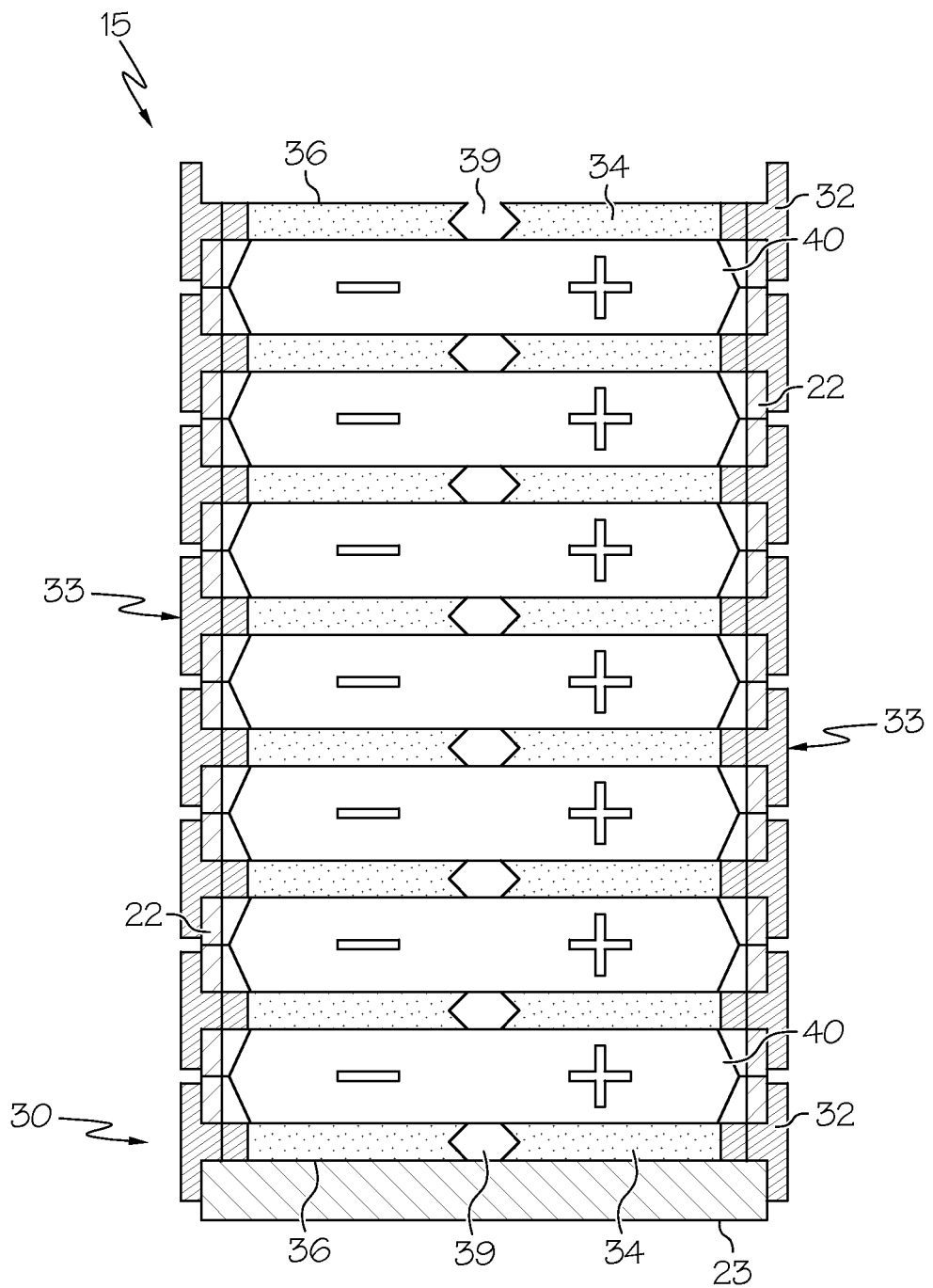
FIG. 4D is a further illustration of the battery pack assembly with the entire alternating stack of cooling fin assemblies and battery cells.
Figure 4E:
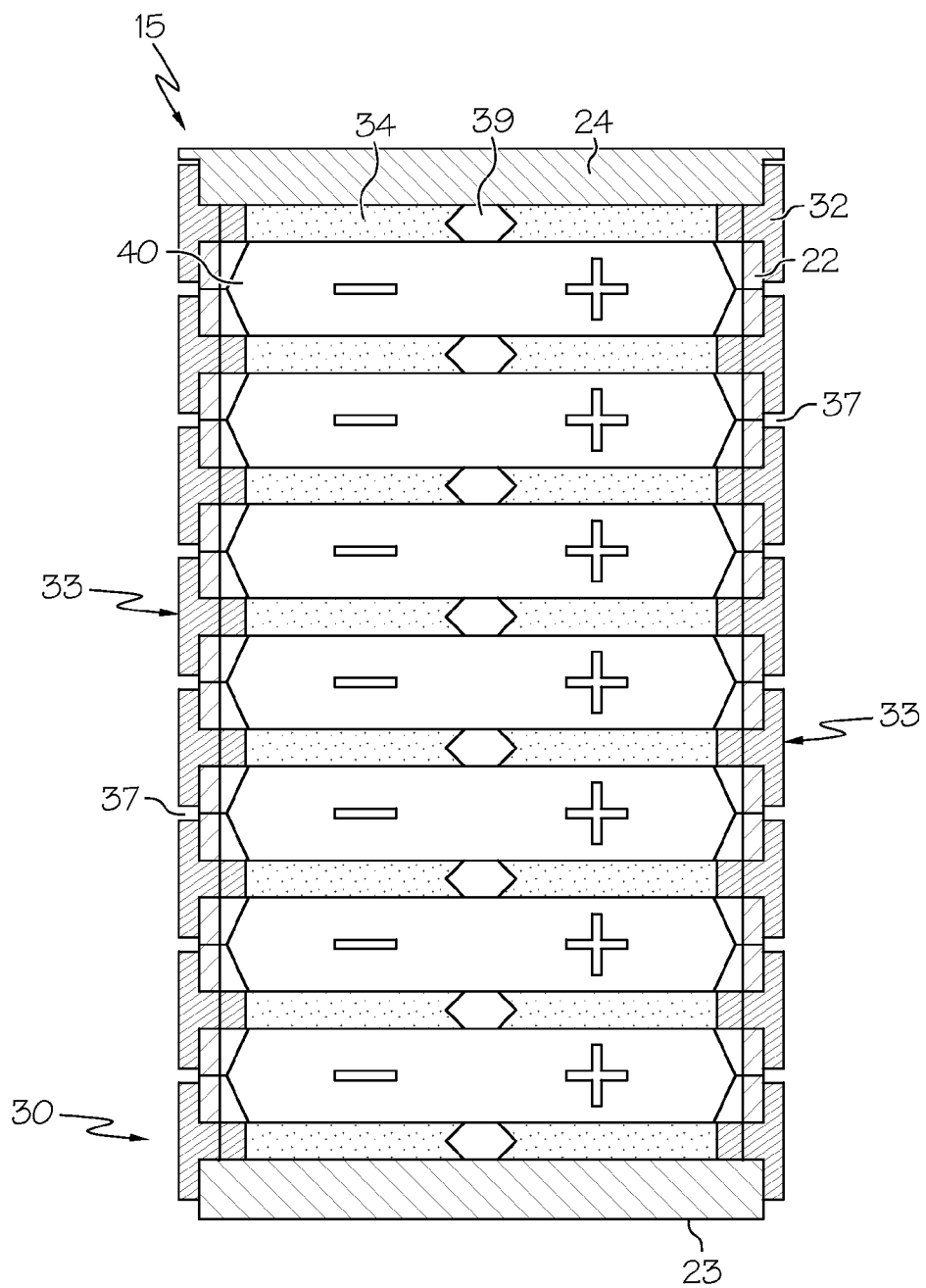
FIG. 4E is a further illustration of the battery pack assembly of FIG. 4D with an end cap in place.
Figure 4F:
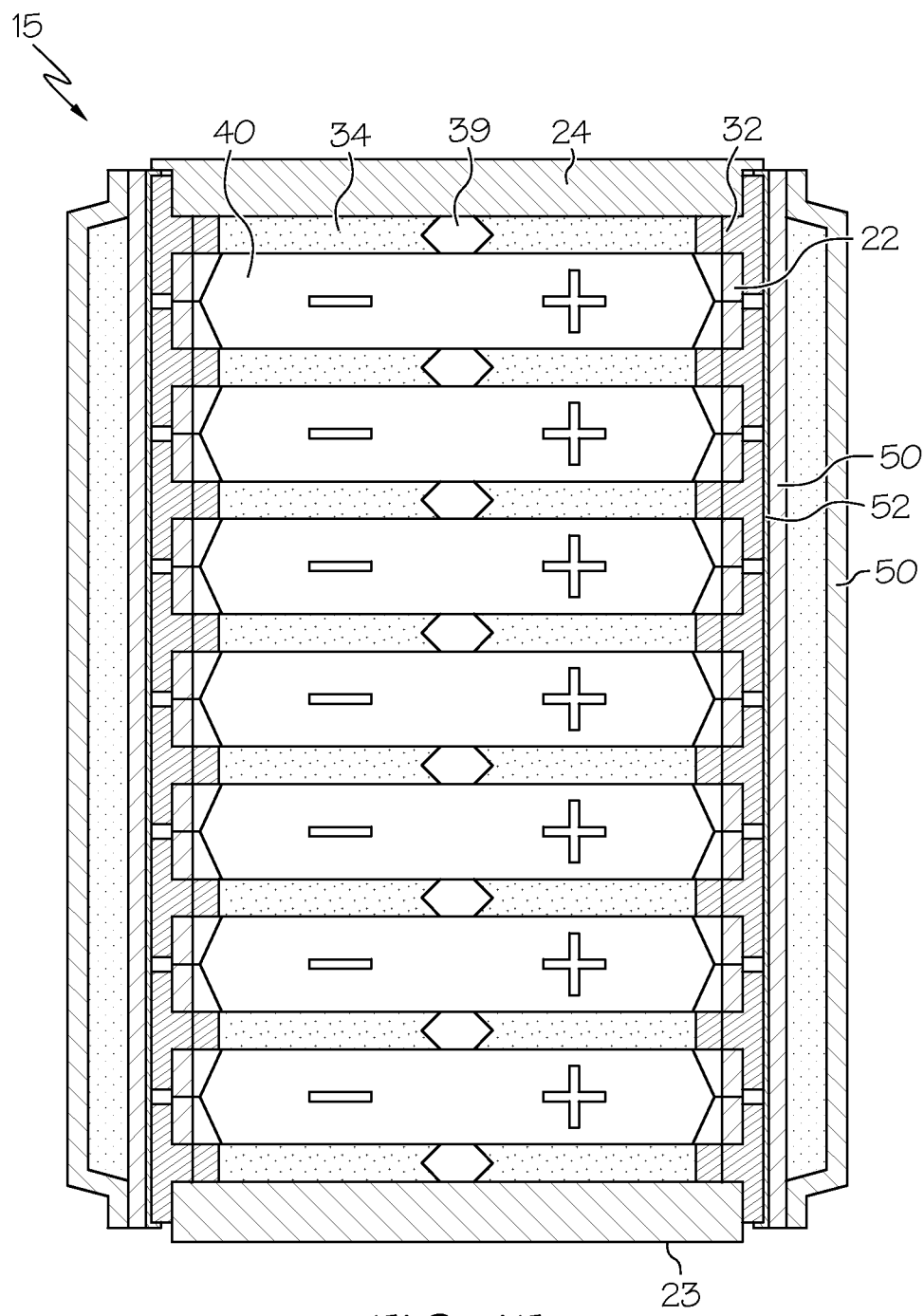
FIG. 4F is a further illustration of the battery pack assembly of FIG. 4E with the heat sink attached to the foot of the cooling fin assemblies.

FIG. 4C is a further illustration of a battery pack assembly 15 including the top structural frame 22 assembled to the bottom structural frame 23 wherein the battery cell 40 is stacked or slotted along the sides of the top structural frame 22 adjacent the cooling fin assembly 30.

FIG. 4D is a further illustration of a battery pack assembly 15 including the top structural frame 22 assembled to the bottom structural frame 23 wherein a plurality of cooling fin assemblies 30 and battery cells 40 are stacked or slotted alternately (i.e., cooling fin assembly, battery cell, cooling fin assembly, battery cell, etc.) until the frame structure 20 is fully occupied or reached full capacity. While the present disclosure is not limited to eight cooling fin assemblies 30 alternately stacked or slotted between seven battery cells 40 within the frame structure 20 as shown in FIG. 4D, the number of cooling fin assemblies 30 and battery cells 40 may vary depending on the dimensions of the frame structure 20. However, other arrangements are possible, for example, arrangements in which there are cooling fin assemblies between every two battery cells (i.e., cooling fin assembly, 2 battery cells, cooling fin assembly, 2 battery cells, etc.) or every three battery cells (i.e., cooling fin assembly, 3 battery cells, cooling fin assembly, 3 battery cells, etc.), such differences are all deemed to be within the scope of the present disclosure.

FIG. 4E is a further illustration of a battery pack assembly 15 wherein once all the repeating, alternating components, cooling fin assemblies 30 and battery cells 40, have been positioned within the top structural frame 22 and bottom structural frame 23, the end cap 24 is assembled on top of the repeating, alternating components and compressed until the end cap 24 bottoms-out on the top structural frame 22. A space or clearance 37 is formed between adjacent feet 32 of each cooling fin assemblies 30 which are stacked or slotted between the battery cells 40 creating a flat interface which ensures parallelism and defines a structural length that will not deform. The feet 32 located on opposite sides of the cooling fin assemblies 30 slide along the ribs 26 (not shown) located on the inside of the top structural frame 22 allowing for the space or clearance 37 of approximately 0.1 mm between the top structural frame 22, the foot 32 and the rib 26 to compensate for tolerance.

FIG. 4F is an further illustration of the heat sink 50 mounted or coupled on at least one side of the battery pack assembly 15 (typically both sides). A layer 52 of TIM is applied between the inner surface of the heat sink 50 and the flat surfaces 33 defined by each foot 32 on opposite sides or opposing edges of the plurality of cooling fin assemblies 30 to ensure good thermal contact.

Figure 5:
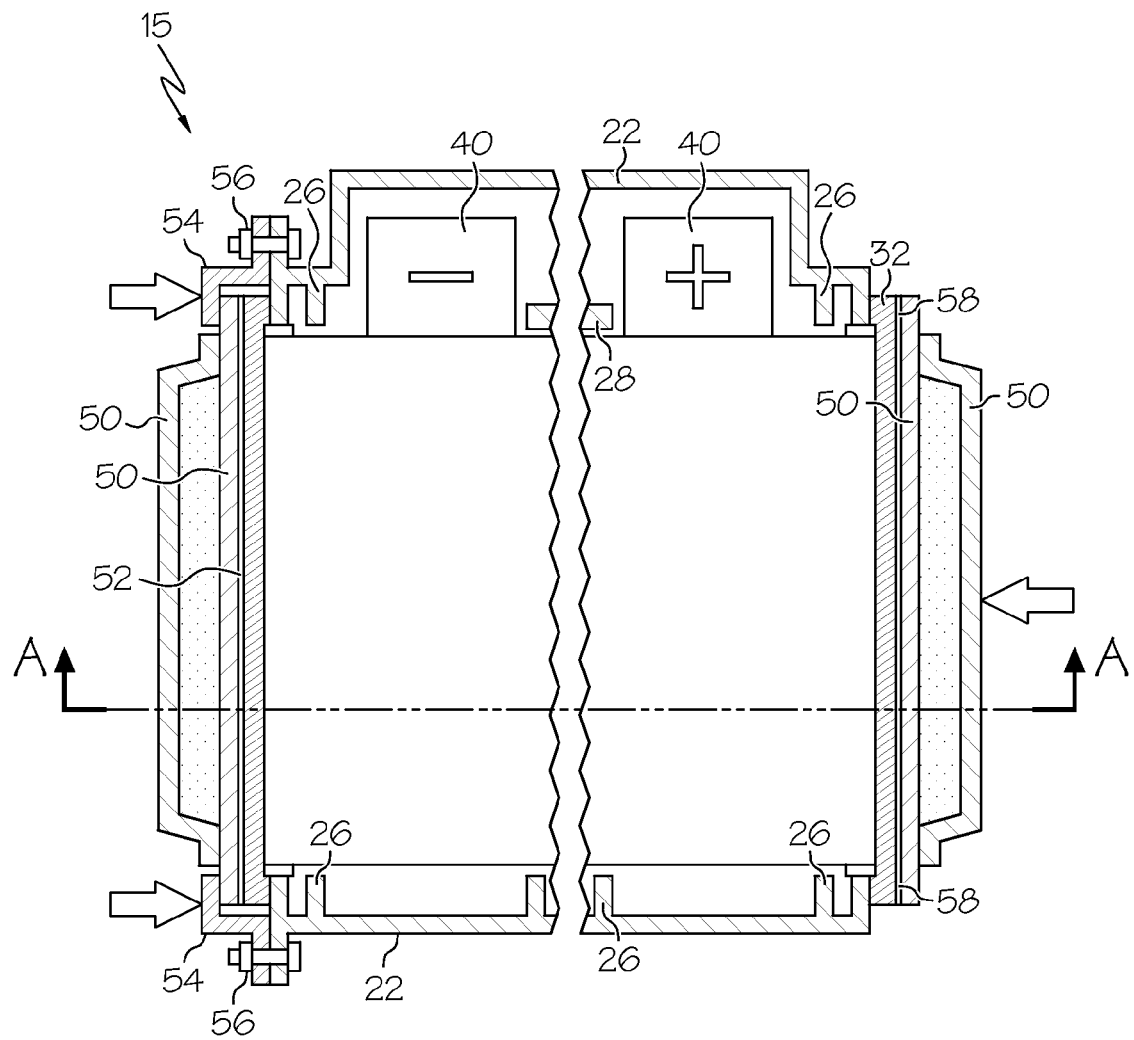
FIG. 5 is a split cross sectional view of the battery pack assembly of FIG. 4F showing two different ways to promote thorough contact between the cooling fin assemblies and the heat sinks.

FIG. 5 is a split cross sectional view of the battery pack assembly 15 of FIG. 4F wherein on the left side, the heat sink 50 is mounted or coupled to the layer 52 of TIM between the inner surface of the heat sink 50 and the flat surfaces 33 defined by each foot 32 on opposite sides or opposing edges of the plurality of cooling fin assemblies 30 by means of at least one clamp 54 and bolt 56 to ensure good thermal contact. Alternatively as shown on the right side, the heat sink 50 is adhered to the flat surfaces 33 defined by each foot 32 on opposite sides or opposing edges of the plurality of cooling fin assemblies 30 by means of an adhesive 58 to ensure good thermal contact.

Figure 6A:
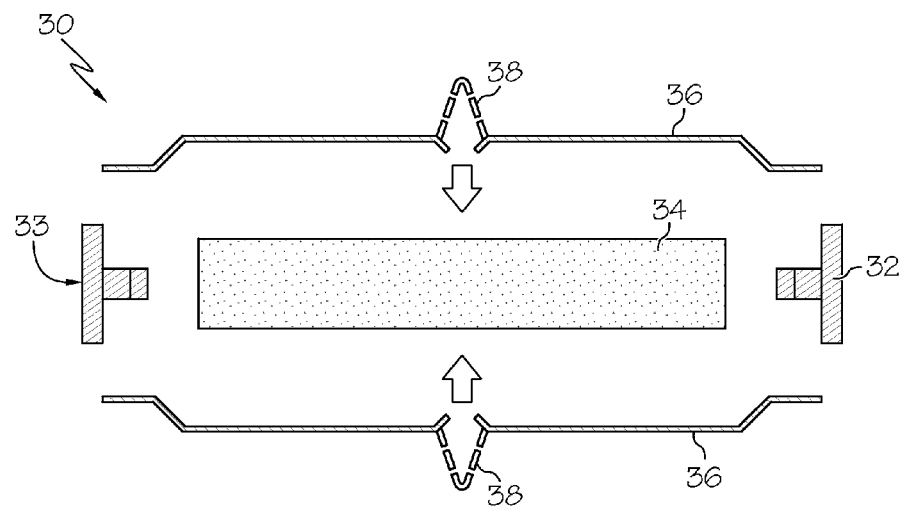
FIG. 6A is an exploded view of a cooling fin assembly according to an aspect of the present disclosure.

FIG. 6A is an exploded view of a cooling fin assembly 30, wherein at least one cooling fin 36 including a compliant structure such as a v-profile 38, or an elastic joining portion. The v-profile 38 allows for the width of the cooling fin 36 to be flexible, allowing for compensation of an over- or under-sized cooling fin 36 to adapt to the width of the frame structure 20. An expansion unit 34, which can be for example, a layer or sheet of foam (shown) or metal leaf spring, wherein the expansion unit 34 compensates for cell tolerance and expansion variation in the cell thickness direction. And, at least one foot 32 having a flat surface 33 wherein the foot 32 may be a separate piece from the cooling fin assembly 30 disposed along the edge of the cooling fin 36. Or, alternatively, the foot 32 may be an integral part of the cooling fin 36 (not shown).

Figure 6B:
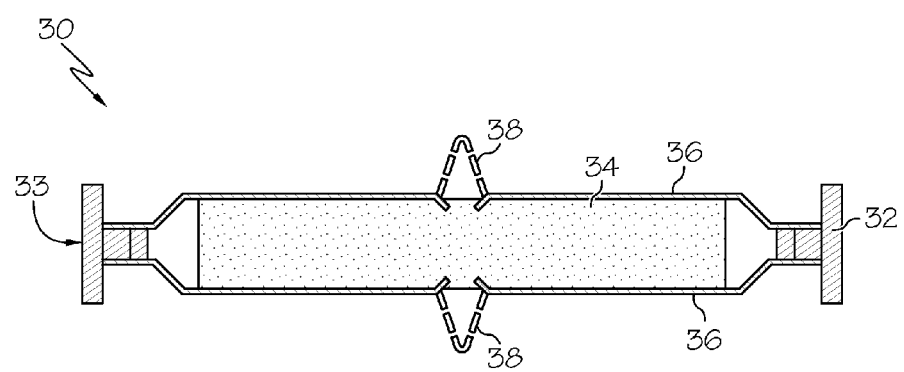
FIG. 6B is an illustration of a cooling fin assembly of FIG. 6A according to an aspect of the present disclosure.

FIG. 6B is a further illustration of a cooling fin assembly 30 of FIG. 6A, wherein each cooling fin 36 including a v-profile 38 is attached on opposite edges to each foot 32 having a flat surface 33 thereon and each cooling fin 36 disposed on opposing surfaces of an expansion unit 34.

Figure 7:
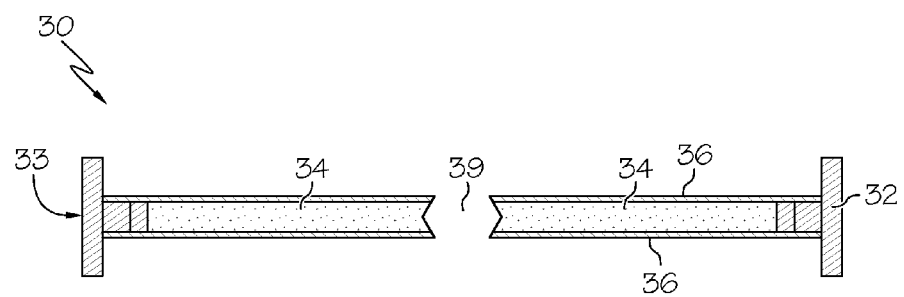
FIG. 7 is an illustration of a cooling fin assembly according to another aspect of the present disclosure.

FIG. 7 is an illustration of a cooling fin assembly 30 including a pair of cooling fins 36 with a compliant structure such as an opening 39 (gap in the center). The pair of cooling fins 36 disposed on opposing surfaces of an expansion unit 34. And, at least one foot 32 having a flat surface 33 disposed on each opposing edge of the cooling fin assembly 30. The pair of cooling fins 36 with the opening 39 allows flexible alignment to each side of the foot 32 individually.

It is noted that terms like "preferably," "commonly," and "typically" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. Likewise, for the purposes of describing and defining the present disclosure, it is noted that the term "device" is utilized herein to represent a combination of components and individual components, regardless of whether the components are combined with other components.

For the purposes of describing and defining the present disclosure it is noted that the term "substantially" is used herein to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

Unless otherwise defined, all technical and scientific terms used herein have the same meaning as commonly understood by one of ordinary skill in the art to which the disclosure belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:

1. A battery pack assembly for an automobile, said battery pack assembly comprising:
   a plurality of battery cells;
   a plurality of cooling fin assemblies, each of which is positioned in thermal communication with at least one of said plurality of battery cells for thermal cooling thereof, each of said plurality of cooling fin assemblies including a respective pair of cooling fins defining a respective compliant structure therein, and at least one respective foot defining a respective flat surface along a respective edge of said respective pair of cooling fins;
   wherein each of the plurality of cooling fin assemblies includes a respective expansion unit configured to compensate for expansion variation of the plurality of battery cells;
   wherein each of the respective expansion units is directly positioned between the respective pair of cooling fins;
   a heat sink;
   a frame structure comprising structural components configured to contain said plurality of battery cells and said plurality of cooling fin assemblies such that upon placement of said plurality of cooling fin assemblies and said plurality of battery cells in said frame structure a substantial entirety of said respective flat surfaces of said respective feet of said plurality of cooling fin assemblies are aligned to define a generally planar surface with which to thermally engage said heat sink;
   wherein the respective compliant structures of the respective pair of cooling fins include a respective v-profile section having a plurality of gaps configured to allow for flexible width tolerance of the respective pair of cooling fins; and
   wherein the plurality of gaps are within the respective v-profile section.

2. The battery pack assembly of claim 1, further comprising a layer of thermal interface material between said respective flat surfaces of said respective feet and said heat sink.

3. The battery pack assembly of claim 1, wherein said respective pair of cooling fins include respective feet disposed on each opposing edge of said respective pair of cooling fins.

4. The battery pack assembly of claim 3, wherein said respective feet on opposing edges of said respective pair of cooling fins align to said frame structure to define length and ensure parallelism of said battery pack assembly.

5. The battery pack assembly of claim 1, wherein said structural components of said frame structure comprise a top structural frame, a bottom structural frame and an end cap.

6. The battery pack assembly of claim 1, wherein said expansion unit is a leaf spring.

7. The battery pack assembly of claim 1, wherein a space is formed between adjacent feet of said plurality of cooling fin assemblies contained in said frame structure.

8. The battery pack assembly of claim 1:
   wherein the respective v-profile section is not co-planar with the respective pair of cooling fins.

9. The battery pack assembly of claim 1, wherein said respective compliant structure of said respective pair of cooling fins includes an opening which allows width tolerance of said respective pair of cooling fins and said respective foot to align with said frame structure.

10. The battery pack assembly of claim 1, wherein said expansion unit is a layer of foam.

11. The battery pack assembly of claim 1:
    wherein the plurality of battery cells are stacked alternately with the plurality of cooling fin assemblies.

\* \* \* \* \*